United States Patent
Liu et al.

(10) Patent No.: US 12,217,487 B2
(45) Date of Patent: Feb. 4, 2025

(54) METHOD, APPARATUS, ELECTRONIC DEVICE, AND MEDIUM FOR GENERATING IMAGE

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 412 days.

(21) Appl. No.: 17/896,818

(22) Filed: Aug. 26, 2022

(65) Prior Publication Data

US 2024/0029408 A1    Jan. 25, 2024

(30) Foreign Application Priority Data

Jul. 22, 2022    (CN) .......................... 202210869407.2

(51) Int. Cl.
*G06V 10/774*    (2022.01)
*G06V 10/40*    (2022.01)
(Continued)

(52) U.S. Cl.
CPC .......... *G06V 10/774* (2022.01); *G06V 10/40* (2022.01); *G06V 10/751* (2022.01); *G06V 10/778* (2022.01); *G06V 10/82* (2022.01)

(58) Field of Classification Search
CPC .... G06V 10/774; G06V 10/40; G06V 10/751; G06V 10/778; G06V 10/82;
(Continued)

(56) References Cited

U.S. PATENT DOCUMENTS 12,062,219 B2 *   8/2024 Huttunen ............. G06V 10/763
2020/0060566 A1 * 2/2020 Howard ............... A61B 5/4824
(Continued)

OTHER PUBLICATIONS

Bridwell, David et al., Moving Beyond ERP Components: A Selective Review of Approaches to Integrate EEG and Behavior, Mar. 2018, Frontiers in Human Neuroscience Review pp. 1-17 (Year: 2018).*

(Continued)

*Primary Examiner* — Lewis G West
(74) *Attorney, Agent, or Firm* — Ryan, Mason & Lewis, LLP

(57) ABSTRACT

In an illustrative embodiment, a method is disclosed for generating an image from fMRI data and EEG data. The method includes extracting a first feature map of the fMRI data, the first feature map being multidimensional data having a temporal dimension related to a sample collection time of the fMRI data, and converting the first feature map based on the temporal dimension of the first feature map and a first attention model. The method further includes extracting a second feature map of the EEG data, the second feature map being multidimensional data having a spatial dimension related to an electrode for collecting the EEG data, and converting the second feature map based on the spatial dimension of the second feature map and a second attention model. The method further includes generating an image based on the converted first feature map and the converted second feature map.

20 Claims, 8 Drawing Sheets

(51) Int. Cl.
G06V 10/75 (2022.01)
G06V 10/778 (2022.01)
G06V 10/82 (2022.01)

(58) Field of Classification Search
CPC .. G06V 10/454; G06V 10/806; G06V 10/449; G06F 18/253; G06F 18/22; G06F 2218/00; G06N 3/08
See application file for complete search history.

(56) References Cited

U.S. PATENT DOCUMENTS

| | | | | |
|---|---|---|---|---|
| 2022/0215955 | A1* | 7/2022 | Sajda | A61B 5/372 |
| 2022/0293244 | A1* | 9/2022 | Leuthardt | G01R 33/4806 |
| 2024/0156414 | A1* | 5/2024 | Mishanin | A61B 5/0006 |
| 2024/0221950 | A1* | 7/2024 | Kollada | A61B 5/0205 |
| 2024/0303534 | A1* | 9/2024 | Wang | G06N 3/045 |

OTHER PUBLICATIONS

Piorecky, Marek et al, Artifacts in Simultaneous hdEEG/fMRI Imaging: A Nonlinear Dimensionality Reduction Approach, Oct. 2019, MDPI, Sensors, pp. 1-21 (Year: 2018).*
V. J. Lawhern et al., "EEGNet: A Compact Convolutional Neural Network for EEG-based Brain-Computer Interfaces," Journal of Neural Engineering, arXiv:1611.08024v4, May 16, 2018, 30 pages.
P. Bashivan et al., "Learning Representations from EEG with Deep Recurrent-Convolutional Neural Networks," International Conference on Learning Representations, arXiv:1511.06448v3, Feb. 29, 2016, 15 pages.
H. Wen et al., "Neural Encoding and Decoding with Deep Learning for Dynamic Natural Vision," Cerebral Cortex, vol. 28, No. 12, Dec. 2018, pp. 4136-4160.
G. Gaziv et al., "Self-Supervised Natural Image Reconstruction and Large-Scale Semantic Classification from Brain Activity," bioRxiv, https://doi.org/10.1101/2020.09.06.284794, Mar. 22, 2022, 26 pages.
R. Vanrullen et al., "Reconstructing Faces from fMRI Patterns Using Deep Generative Neural Networks," Communications Biology, vol. 2, No. 193, May 21, 2019, 10 pages.
G. Gaziv et al., "More Than Meets the Eye: Self-Supervised Depth Reconstruction From Brain Activity," arXiv:2106.05113v3, Mar. 22, 2022, 11 pages.
Y. Kamitani et al., "Decoding the Visual and Subjective Contents of the Human Brain," Nature Neuroscience, vol. 8, No. 5, May 2005, pp. 679-685.
A. Fares et al., "Brain-media: A Dual Conditioned and Lateralization Supported GAN (DCLS-GAN) towards Visualization of Image-evoked Brain Activities," Proceedings of the 28th ACM International Conference on Multimedia, Oct. 12-16, 2020, pp. 1764-1772.
J. Jiang et al., "A Brain-Media Deep Framework Towards Seeing Imaginations Inside Brains," IEEE Transactions on Multimedia, vol. 23, Jun. 1, 2020, 13 pages.
V. Menon et al., "Combined EEG and fMRI Studies of Human Brain Function," International Review of Neurobiology, vol. 66, Dec. 29, 2005, pp. 291-321.
K. Simonyan et al., "Very Deep Convolutional Networks for Large-Scale Image Recognition," International Conference on Learning Representations, arXiv:1409.1556v6, Apr. 10, 2015, 14 pages.
P. Bojanowski et al., "Optimizing the Latent Space of Generative Networks," International Conference on Machine Learning, arXiv:1707.05776v2, May 20, 2019, 10 pages.
A. Dosovitskiy et al., "An Image is Worth 16x16 Words: Transformers for Image Recognition at Scale," International Conference on Learning Representations, arXiv:2010.11929v2, Jun. 3, 2021, 22 pages.
Neurosky, "Mindflex," https://store.neurosky.com/products/mindflex, Accessed Jul. 15, 2022, 3 pages.
Necomini, "Brainwave Cat Ears," https://www.necomimi.com/, Accessed Jul. 15, 2022, 5 pages.
Neurosky, "MindWave Mobile 2," https://store.neurosky.com/pages/mindwave, Accessed Jul. 15, 2022, 3 pages.
Emotiv, "EPOC X, " https://www.emotiv.com/epoc-x/, Accessed Jul. 15, 2022, 11 pages.

* cited by examiner

METHOD, APPARATUS, ELECTRONIC DEVICE, AND MEDIUM FOR GENERATING IMAGE

RELATED APPLICATION(S)

The present application claims priority to Chinese Patent Application No. 202210869407.2, filed Jul. 22, 2022, and entitled "Method, Apparatus, Electronic Device, and Medium for Generating Image," which is incorporated by reference herein in its entirety.

FIELD

Embodiments of the present disclosure relate to the field of computers, and more particularly, to a method, an apparatus, an electronic device, a computer-readable storage medium, and a computer program product for generating an image.

BACKGROUND

Deep learning technologies have been used in a wide range of fields, and combining it with biology is one of the most attractive topics. Technical professionals use neural network models to analyze biometric data from human brains to learn about people's perception, such as objects people see, hear, or touch.

An object seen by people may be inferred by analyzing electroencephalogram (EEG) data or functional magnetic resonance (fMRI) data. However, existing neural network models cannot extract enough information from EEG data and fMRI data, so the image quality obtained by inference is low and cannot meet actual requirements.

SUMMARY

The present disclosure provides a method, an apparatus, an electronic device, and a medium for generating an image, which are used for generating an image from fMRI data and EEG data.

According to a first aspect of the present disclosure, a method for generating an image from fMRI data and EEG data is provided. The method includes extracting a first feature map of the fMRI data, the first feature map being multidimensional data having a temporal dimension related to a sample collection time of the fMRI data, and converting the first feature map based on the temporal dimension of the first feature map and a first attention model. The method further includes extracting a second feature map of the EEG data, the second feature map being multidimensional data having a spatial dimension related to an electrode for collecting the EEG data, and converting the second feature map based on the spatial dimension of the second feature map and a second attention model. The method further includes generating an image based on the converted first feature map and the converted second feature map.

According to embodiments of the present disclosure, correlation information across time and space is extracted by combining characteristics of fMRI data and EEG data, so that the content viewed by a user can be effectively inferred from physiological data of the user.

According to a second aspect of the present disclosure, a neural network model and a method for training a model are provided. The neural network model includes a first feature extraction model configured to extract, from fMRI data, a first feature map of the fMRI data, the first feature map being multidimensional data having a temporal dimension related to a sample collection time of the fMRI data, and a first conversion model configured to convert the first feature map based on the temporal dimension, the first conversion model including a first attention model. The neural network model further includes a second feature extraction model configured to extract, from EEG data, a second feature map of the EEG data, the second feature map being multidimensional data having a spatial dimension related to an electrode for collecting the EEG data, and a second conversion model configured to convert the second feature map based on the spatial dimension, the second conversion model including a second attention model. The neural network model further includes a generation model configured to generate an image based on the converted first feature map and the converted second feature map.

The method includes generating a training dataset and updating the model based on the training dataset. The training dataset includes: a first target image and first fMRI data and first EEG data corresponding to the first target image; a second target image and second fMRI data and second EEG data corresponding to the second target image; and a third target image and third fMRI data and third EEG data corresponding to the third target image. The third target image is a spatial combination of the first target image and the second target image.

According to a third aspect of the present disclosure, an apparatus for generating an image from fMRI data and EEG data is provided. The apparatus includes a first feature extraction unit, a first conversion unit, a second feature extraction unit, a second feature conversion unit, and a generation unit. The first feature extraction unit is configured to extract a first feature map of the fMRI data, the first feature map being multidimensional data having a temporal dimension related to a sample collection time of the fMRI data. The first conversion unit is configured to convert the first feature map based on the temporal dimension of the first feature map and a first attention model. The second feature extraction unit is configured to extract a second feature map of the EEG data, the second feature map being multidimensional data having a spatial dimension related to an electrode for collecting the EEG data. The second conversion unit is configured to convert the second feature map based on the spatial dimension of the second feature map and a second attention model. The generation unit is configured to generate an image based on the converted first feature map and the converted second feature map.

According to a fourth aspect of the present disclosure, an electronic device is further provided, including: at least one processing unit; and at least one memory that is coupled to the at least one processing unit and stores instructions for execution by the at least one processing unit, wherein the instructions, when executed by the at least one processing unit, cause the electronic device to perform the method according to the first aspect or the second aspect of the present disclosure.

According to a fifth aspect of the present disclosure, a non-transitory computer-readable storage medium including machine-executable instructions is further provided, and the machine-executable instructions, when executed by a device, cause the device to perform the method according to the first aspect or the second aspect of the present disclosure.

According to a sixth aspect of the present disclosure, a computer program product including machine-executable instructions is further provided, and the machine-executable instructions, when executed by a device, cause the device to perform the method according to the first aspect or the second aspect of the present disclosure.

It should be understood that this Summary is neither intended to identify key or essential features of embodiments of the present disclosure, nor intended to limit the scope of the present disclosure. Other features of the present disclosure will become readily understood from the following description.

BRIEF DESCRIPTION OF THE DRAWINGS

The above and other objectives, features, and advantages of embodiments of the present disclosure will become more readily understandable through the following detailed description with reference to the accompanying drawings. In the accompanying drawings, a plurality of embodiments of the present disclosure will be illustrated by way of example and not limitation, where.

DETAILED DESCRIPTION

Figure 1:
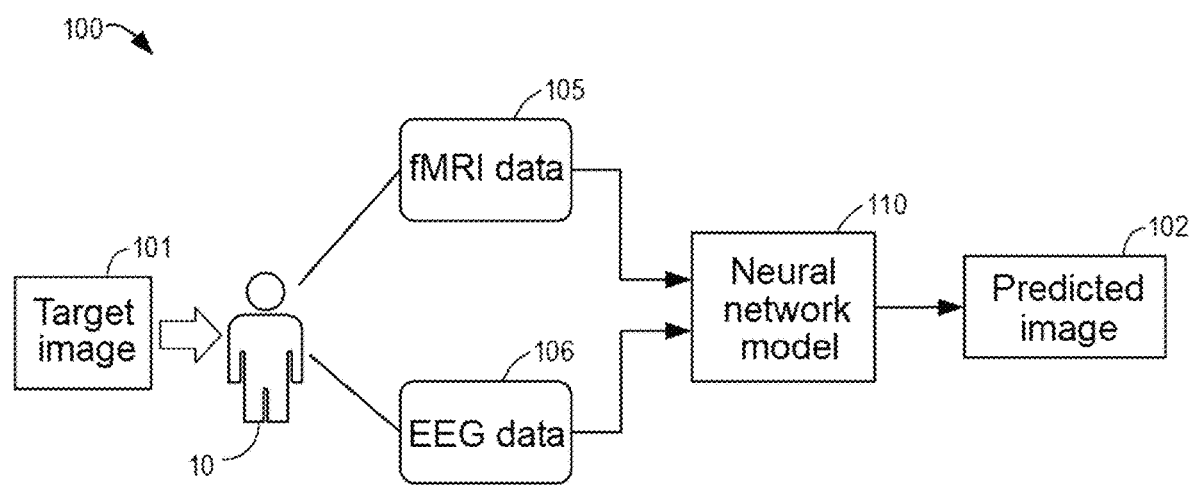
FIG. 1 shows a schematic diagram of an example environment in which an embodiment of the present disclosure can be implemented.

The concept of the present disclosure will now be illustrated with reference to various example embodiments shown in the accompanying drawings. It should be understood that these embodiments are described only for the purpose of enabling a person skilled in the art to better understand and then implement the present disclosure, instead of limiting the scope of the present disclosure in any way. It should be noted that similar or identical reference signs may be used in the drawings where feasible, and similar or identical reference signs may indicate similar or identical elements. Those skilled in the art will understand that from the following description, alternative embodiments of the structures and/or methods described herein may be adopted without departing from the principles and concepts of the present disclosure described.

In the context of the present disclosure, the term "include" and various variants thereof can be understood as open terms, meaning "including but not limited to." The term "based on" can be understood as "based at least in part on." The term "one embodiment" can be understood as "at least one embodiment." The term "another embodiment" can be understood as "at least one additional embodiment." Other terms that may appear but are not mentioned here, unless explicitly stated, should not be interpreted or limited in a manner that is contrary to the concept on which embodiments of the present disclosure are based.

Basic principles and implementations of the present disclosure are illustrated below with reference to the drawings. It should be understood that example embodiments are provided only to enable those skilled in the art to better understand and then implement embodiments of the present disclosure, and not to limit the scope of the present disclosure in any way.

When a person observes the external world, brain activities cause corresponding changes in his/her biological signals. These biological signals may be used to infer an environment that the person sees at this time. Changes in electrical signals can be detected by attaching some electrodes to the scalp, and over time, a one-dimensional electrical signal that changes with respect to time may be collected from each electrode, so as to obtain so-called electroencephalogram (EGG) data. In addition, the functional magnetic resonance imaging (fMRI) technology may be used for detecting hemodynamic data (such as blood-oxygen-level dependent (BOLD) data) of various parts of the brain to obtain volume data about the brain. By slicing the volume data, images that change with respect to space may be obtained. Therefore, the EEG data naturally has good local temporal correlation information, but spatial correlations between different patches are difficult to mine. Local spatial information of fMRI data is easy to be acquired, but temporal correlations between fMRI data collected at different times are difficult to mine and utilize.

In view of this, embodiments of the present disclosure provide a method for generating an image by integrating characteristics of fMRI data and EEG data. The method includes extracting a feature map of fMRI data. The fMRI data is multidimensional data and has a temporal dimension reflecting a sample collection time, and the corresponding feature map is also multidimensional data and also has a temporal dimension. In this method, the feature map of the fMRI data is further converted based on the temporal dimension and an attention model, so that the converted feature map carries temporal correlation information of the fMRI data. The method further includes extracting a feature map of EEG data from a plurality of electrodes. The EEG data is also multidimensional data, which has a spatial dimension reflecting a source electrode of a signal, and the corresponding feature map is also multidimensional data and also has a spatial dimension. In this method, the feature map of the EEG data is further converted based on the spatial dimension and another attention model to extract spatial correlation information of the EEG data. Then, in this method, an image is generated based on the converted feature map of the fMRI data and the converted feature map of the EEG data.

The fMRI data may be multidimensional data (H×W×3× T), where H represents the image height, W represents the image width, 3 represents the color channel (being 1 if it is a black and white image), and T represents the sample collection time.

Example embodiments of the present disclosure will be described below with reference to FIG. 1 to FIG. 9.

FIG. 1 shows a schematic diagram of example environment 100 in which an embodiment of the present disclosure can be implemented. In environment 100, person 10 carrying a biological signal detection apparatus views target image 101. The biological signal detection apparatus includes an fMRI device (not shown) for detecting an fMRI signal and an EEG device (not shown) for detecting an EEG signal. The fMRI signal and the EEG signal may be collected over time, and then operations such as noise reduction, blur reduction, contrast enhancement, and normalization are performed on the collected fMRI signal and EEG signal to generate corresponding fMRI data 105 and EEG data 106.

At a sampling time (for example, a duration of 1 second or other time), the fMRI signal may include dimensions such as: image height H, image width W, and number of channels (for an RGB color image, the number of channels is 3). Therefore, the resulting fMRI data may be multidimensional data of H×W×3×T, where T is the total number of times of time sampling.

At sampling time T, the EEG signal may include the following dimensions: intensity (it may be the intensity in a frequency domain or the intensity in a time domain) K of the EEG signal, electrode C that collects the EEG signal (indicating the source of the EEG signal), and sampling time T. Therefore, the obtained EEG data may be multidimensional data of K×C×T. The sampling times of the EEG signal and the fMRI signal may be aligned.

fMRI data 105 and EEG data 106 may be provided to neural network model 110 according to an embodiment of the present disclosure. Neural network model 110 may be trained and, after training, generate predicted image 102 based on input fMRI data 105 and EEG data 106. Neural network model 110 may be deployed and run at any suitable computing device, for example, a personal computer, a notebook computer, a smart phone, a tablet, a server, or a cluster, or may be deployed at a cloud. Predicted image 102 and target image 101 may have similarity, and therefore, target image 101 viewed by person 10 may be inferred by detecting a biological signal of person 10. An example structure of neural network model 110 will be described below with reference to FIG. 2, and an example training process thereof will be described with reference to FIG. 7, which will not be described in detail here.

Example environment 100 in which an embodiment of the present disclosure can be implemented is shown with reference to FIG. 1. It should be understood that environment 100 is only an example, and embodiments of the present disclosure may also be implemented in different environments. Environment 100 may include more components, and some components may be omitted. For example, fMRI data and EEG data may be pre-stored and not necessarily collected in real time.

Figure 2:
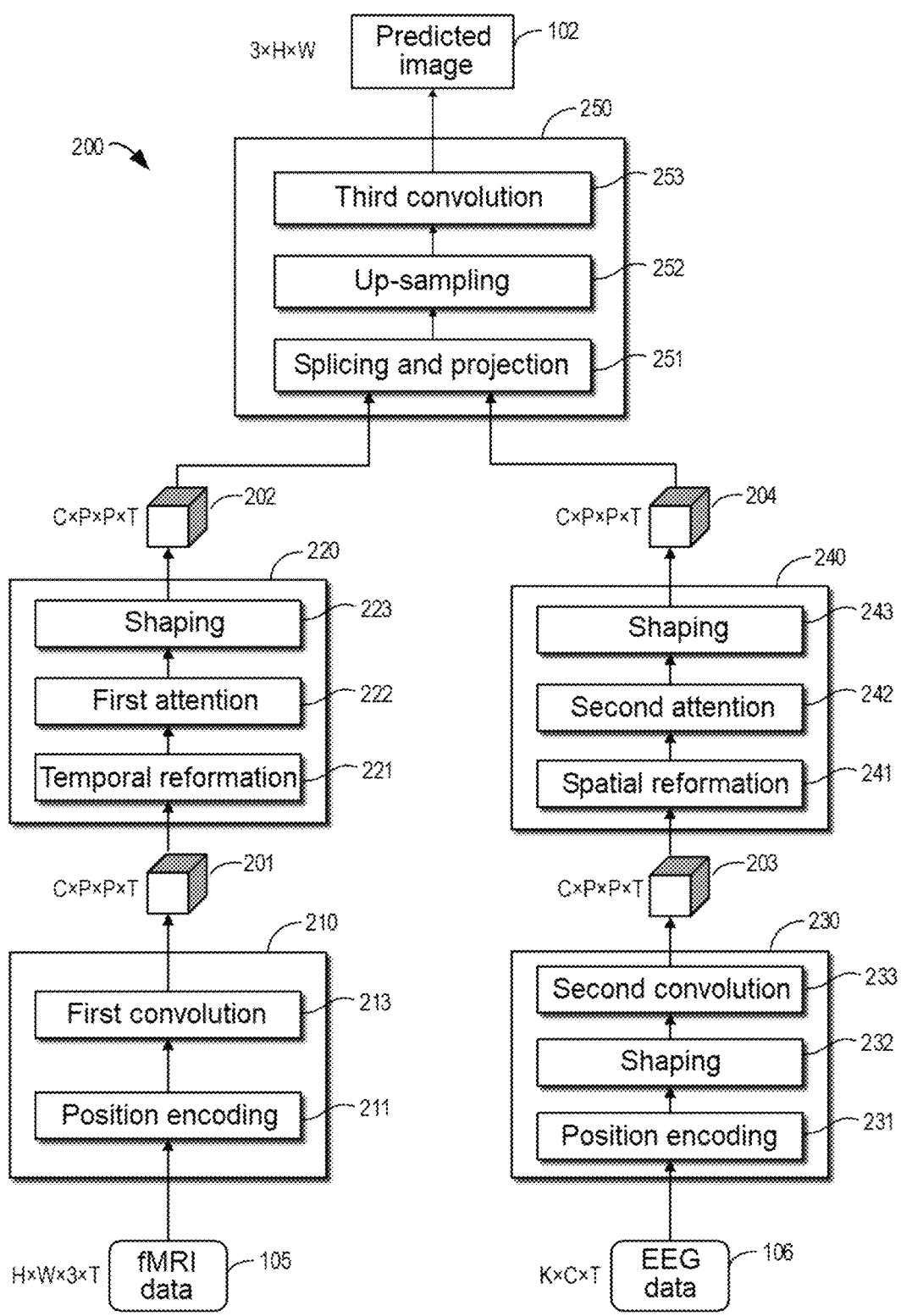
FIG. 2 shows a schematic diagram of an example structure of a neural network model according to an embodiment of the present disclosure.

FIG. 2 shows a schematic diagram of an example structure of a neural network model according to an embodiment of the present disclosure. Neural network model 200 may be an example implementation of neural network model 110 in FIG. 1. In general, neural network model 200 is divided into two branches at an input end: one branch on the left for processing fMRI data 105, and the other branch on the right for processing EEG data 106, which are described separately below.

As shown in FIG. 2, fMRI data 105 may be, for example, four-dimensional data of H×W×3×T, and is first input to first feature extraction model 210. First feature extraction model 210 includes position encoding module 211 and first convolution model 213 in sequence. Position encoding module 211 is configured to encode temporal information of fMRI data 105 in order to preserve temporal information about sample collection time in original fMRI data 105. For example, by using a predefined two-dimensional encoded map, two encoded values from the two-dimensional encoded map are added based on temporal dimension to fMRI data 105 for augmentation, and then the augmented data is mapped to the original dimension size, i.e., H×W×3×T through a linear mapping (parameters of the linear mapping may be determined through a training process).

Then, first convolution model 213 is used for extracting, from the position-encoded fMRI data, fMRI feature map 201 in a dimension size C×P×P×T. Here, first convolution model 213 may include a group of convolution kernels for mapping the number of channels (3 channels for the RGB) to a dimension of size C, and mapping an fMRI image of a dimension H×W to a feature in a size of P×P. Here, C may be a pre-configured value, for example, the same as the number C of electrodes of EEG data 106. P may be a pre-set value, such as 64 or another value.

Next, fMRI feature map 201 is provided to first conversion model 220. First conversion model 220 includes temporal reformation module 221, first attention model 222, and shaping module 223 in sequence. Temporal reformation module 221 splices and reforms fMRI feature map 201 of C×P×P×T. Specifically, the fMRI feature map 201 may be reformed into T×P×(C×P) based on temporal dimension T. In other words, the original four-dimensional data is dimension-reduced to three-dimensional data, and the temporal dimension is preserved as the first dimension of the three-dimensional data. It should be noted that other reformation manners are also available, which are not limited in the present disclosure.

Next, first attention model 222 may be used for calculating correlation information along the temporal dimension. For fMRI, the temporal dimension is non-local, and therefore, temporal correlation information for the fMRI data may be extracted. It should be noted that first attention model 222 does not change the dimension size of the input, and therefore, its output is still multidimensional data of T×P×(C×P).

After first attention model 222, shaping module 223 is used for converting the multidimensional data in a dimension size of T×P×(C×P) with the temporal correlation information back to the dimension size C×P×P×T to obtain converted fMRI feature map 202.

Reference is made to the branch for EEG data 106 on the right side of FIG. 2. EEG data 106 is also multidimensional data, and its dimension size may be K×C×T, where K corresponds to the signal intensity, C corresponds to the electrode, and T corresponds to the sampling time sample. EEG data 106 is first input to second feature extraction model 230. Second feature extraction model 230 includes position encoding module 231, shaping module 232, and second convolution model 233 in sequence.

Position encoding module 211 is configured to encode temporal information of EEG data 106 so as to preserve temporal information about the sample collection time in original EEG data 106. For example, by using a predefined two-dimensional encoded map, two encoded values from the two-dimensional encoded map are added based on temporal dimension to EEG data 106 for augmentation, and then the augmented data is mapped to the original dimension size, that is, K×C×T through a linear mapping (parameters of the linear mapping may be determined through a training process).

Then, shaping module 232 may be used for shaping the multidimensional data in a dimension size of K×C×T into four-dimensional data of K×1×C×T. Second convolution model 233 is used for generating EEG feature map 203 in a dimension size of C×P×P×T from the four-dimensional data in a dimension size of K×1×C×T. Second convolution model 233 may include a group of convolution kernels for mapping an EEG collection result in a dimension size of K×1 to a feature in a size of P×P. P may be a pre-set value, such as 64, which is the same as the setting for the fMRI data. Here, the spatial dimension and the temporal dimension are preserved.

Next, EEG feature map 203 is provided to second conversion model 240. Second conversion model 240 includes spatial reformation module 241, second attention model 242, and shaping module 243 in sequence. Spatial reformation module 241 splices and reforms EEG feature map 203 of C×P×P×T, and specifically, the EEG feature map may be reformed into C×P×(T×P) based on spatial dimension. In other words, the original four-dimensional data is dimension-reduced to three-dimensional data, and the spatial dimension is preserved as the first dimension of the three-dimensional data. It should be noted that other reformation manners are also available, which are not limited in the present disclosure.

Next, second attention model 242 may be used for calculating correlation information along the temporal dimension. For EEG, the temporal dimension is non-local, so that spatial correlation information for the EEG data may be extracted. It should be noted that second attention model 242 does not change the dimension size of the input, and therefore, its output is still multidimensional data of C×P×(T×P).

After second attention model 242, shaping module 243 is used for converting the multidimensional data in a dimension size of C×P×(T×P) with spatial correlation information back to the dimension size C×P×P×T to obtain converted EEG feature map 204.

As shown in the drawing, neural network model 200 further includes generation model 250. Generation model 250 receives converted fMRI feature map 202 and converted EEG feature map 204 as inputs. Generation model 250 includes splicing and projection module 251, up-sampling module 252, and third convolution model 253.

Splicing and projection module 251 is configured to splice together two pieces of multidimensional data of the same size, i.e., converted fMRI feature map 202 and converted EEG feature map 204, so as to obtain a combined feature map in a dimension size of 2C×P×P×T. Then the temporal dimension in the combined feature map is eliminated through linear projection to obtain three-dimensional data in a dimension size of 2C×P×P.

Up-sampling module 252 is configured to up-sample three-dimensional data of 2C×P×P to generate three-dimensional data of 2C×H×W. Then, third convolution model 253 converts the three-dimensional data in the size of 2C×H×W into three-dimensional data of 3×H×W. Here, predicted image 102 may be generated by taking color channel as the first dimension, and the height and width of the image as the second dimension H and the third dimension W.

Figure 3:
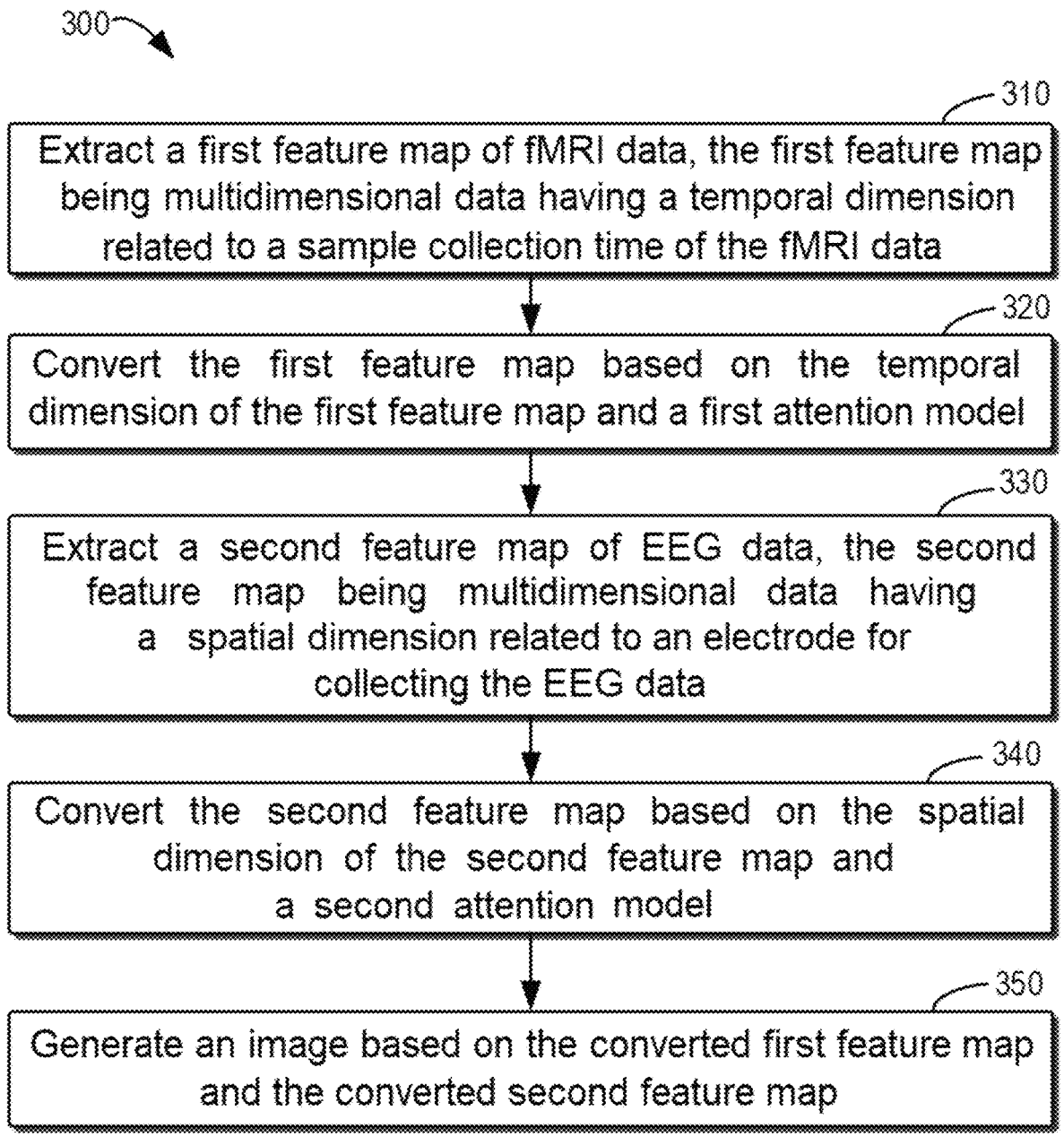
FIG. 3 shows a flow chart of a process for generating an image from fMRI data and EEG data according to an embodiment of the present disclosure.

FIG. 3 shows a flow chart of process 300 for generating an image from fMRI data and EEG data according to an embodiment of the present disclosure. Process 300 may be performed by trained neural network model 110 or 200 or a device running neural network model 110 or 200. For ease of discussion, process 300 will be described with reference to FIG. 2.

At block 310, first feature map 201 of the fMRI data 105 is extracted, first feature map 201 being multidimensional data having a temporal dimension related to a sample collection time of the fMRI data 105. The fMRI data 105 may be multidimensional data in a dimension size of H×W×3×T, where H is the dimension corresponding to the height of the fMRI image, W is the dimension corresponding to the width of the fMRI image, 3 is the dimension corresponding to the number of channels of the RGB image, and T is the temporal dimension corresponding to the sample sampling time of the fMRI data. For example, the fMRI data may include a group of fMRI images collected at a plurality of sampling times, and the sampling time may be a time period corresponding to a temporal resolution of the fMRI device, for example, 1 second or another time period. In some embodiments, first feature map 201 may be extracted using first feature extraction model 210 in FIG. 2.

Figure 4A:
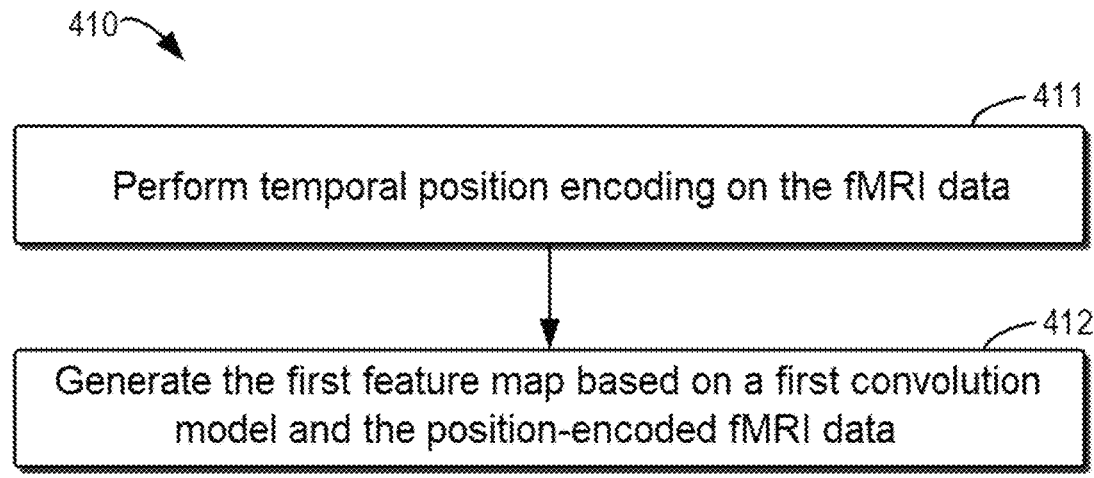
FIG. 4A shows a flow chart of a process of extracting a feature map from fMRI data according to an embodiment of the present disclosure.

Referring to FIG. 4A, a flow chart of process 410 of extracting a feature map from fMRI data according to an embodiment of the present disclosure is shown. Process 410 may be an example implementation of block 310 of FIG. 3.

At block 411, temporal position encoding is performed on fMRI data 105. In some embodiments, temporal information of fMRI data 105 is encoded by using position encoding module 211. After the position encoding, the temporal information about the sample collection time in original fMRI data 105 can be preserved. For example, by using a predefined two-dimensional encoded map, two encoded values from the two-dimensional encoded map are added based on the temporal dimension to fMRI data 105 for augmentation, and then the augmented data is mapped to the original size through linear mapping.

At block 412, first feature map 201 is generated based on a first convolution model and the position-encoded fMRI data. In some embodiments, first convolution model 213 is used for mapping the number of channels (3 channels for the RGB) to a dimension in a size of C, and mapping an fMRI image in a dimension of H×W to a feature in a size of P×P. C may be set to be the same as the number of electrodes of the EEG. P may be a pre-set value, such as 64 or another value. Therefore, first feature map 201 is multidimensional data in a dimension size of C×P×P×T.

Still referring to FIG. 3, at block 320, first feature map 201 is converted based on the temporal dimension of first feature map 201 and first attention model 222. In some embodiments, first feature map 201 may be converted by using first conversion model 220 in FIG. 2.

Figure 5A:
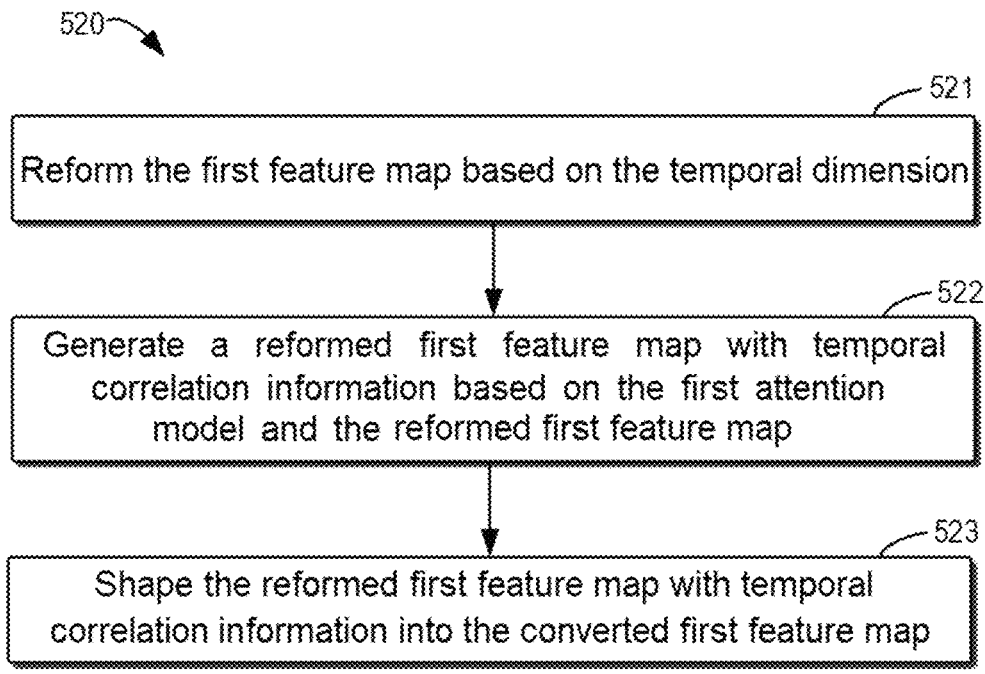
FIG. 5A shows a flow chart of a process for converting a feature map of fMRI data according to an embodiment of the present disclosure.

Referring to FIG. 5A, a flow chart of process 520 for converting an fMRI feature map according to an embodiment of the present disclosure is shown. Process 520 may be an example implementation of block 320 of FIG. 3.

At block 521, first feature map 201 is reformed based on the temporal dimension. First feature map 201 may be reformed by using temporal reformation module 221 in first conversion model 220. Temporal reformation module 221 splices and reforms first feature map 201 of C×P×P×T, and reforms, based on temporal dimension T, first feature map 201 into multidimensional data in a dimension size of T×P×(C×P).

At block 522, a reformed first feature map with temporal correlation information is generated based on first attention model 222 and the reformed first feature map. Correlation information along the temporal dimension of the fMRI data may be calculated using first attention model 222. For fMRI, the temporal dimension is non-local, and therefore, temporal correlation information for fMRI data 105 can be extracted.

At block 523, the reformed first feature map with temporal correlation information is shaped into converted first feature map 202. Converted first feature map 202 and first feature map 201 have the same size, both of which are C×P×P×T.

Still referring to FIG. 3, at block 330, second feature map 203 of EEG data 106 is extracted, second feature map 203 being multidimensional data having a spatial dimension related to an electrode for collecting the EEG data. In some embodiments, fMRI data 105 and EEG data 106 are collected in the same time period. That is, the temporal dimensions of fMRI data 105 and EEG data 106 are aligned. In some embodiments, second feature map 203 may be extracted using second feature extraction model 230 in FIG. 2.

Figure 4B:
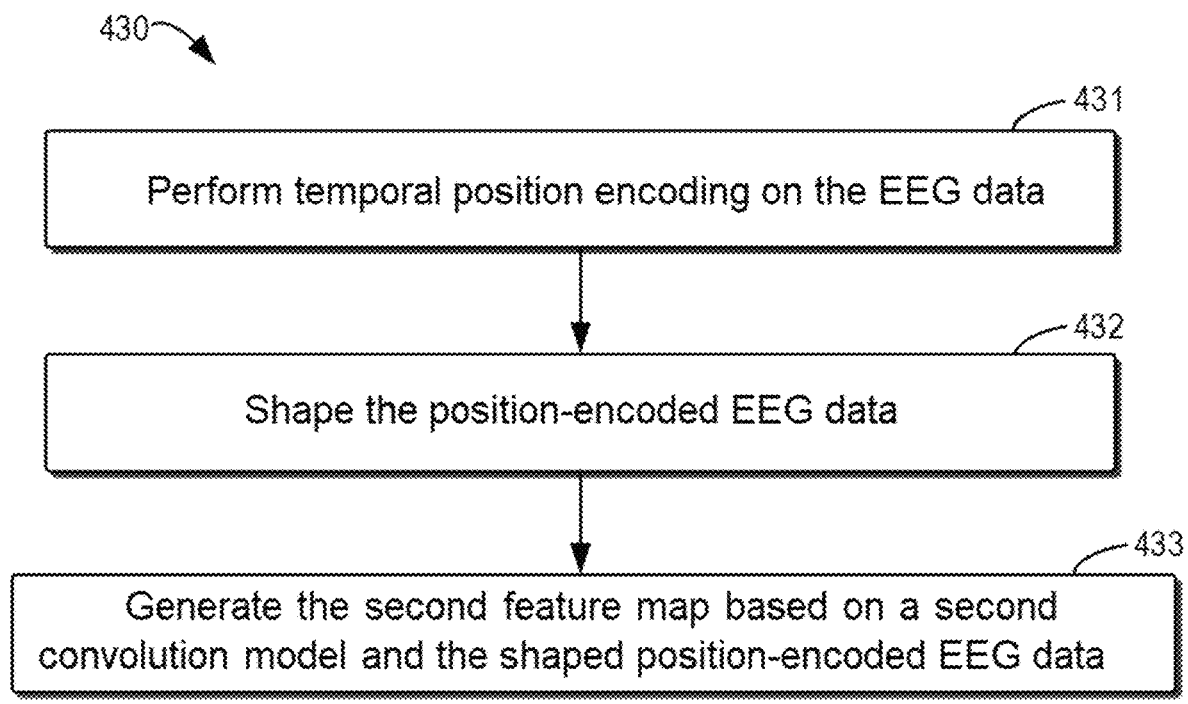
FIG. 4B shows a flow chart of a process of extracting a feature map from EEG data according to an embodiment of the present disclosure.

FIG. 4B shows an example implementation of process 430 of extracting second feature map 203 from EEG data 106. At block 431, temporal position encoding is performed on EEG data 106. In some embodiments, position encoding module 231 may be used for position encoding of the EEG data. The manner of position encoding may be the same as that of position encoding module 211, and details are not repeated here. The position-encoded EEG data may be multidimensional data in a dimension size of K×C×T, whose size is the same as that of original EEG data 106.

At block 432, the position-encoded EEG data is shaped. In some embodiments, shaping module 232 may be used for shaping the position-encoded multidimensional data in a dimension size of K×C×T into four-dimensional data of K×1×C×T.

Next, at block 433, second feature map 203 is generated based on second convolution model 233 and the shaped position-encoded EEG data. Second convolution model 233 extracts features from the four-dimensional data in a dimension size of K×1×C×T, and obtains EEG feature map 203 in a dimension size of C×P×P×T.

Still referring to FIG. 3, at block 340, second feature map 203 is converted based on the spatial dimension of second feature map 203 and second attention model 242. In some embodiments, second feature map 203 may be converted using second conversion model 240 in FIG. 2.

Figure 5B:
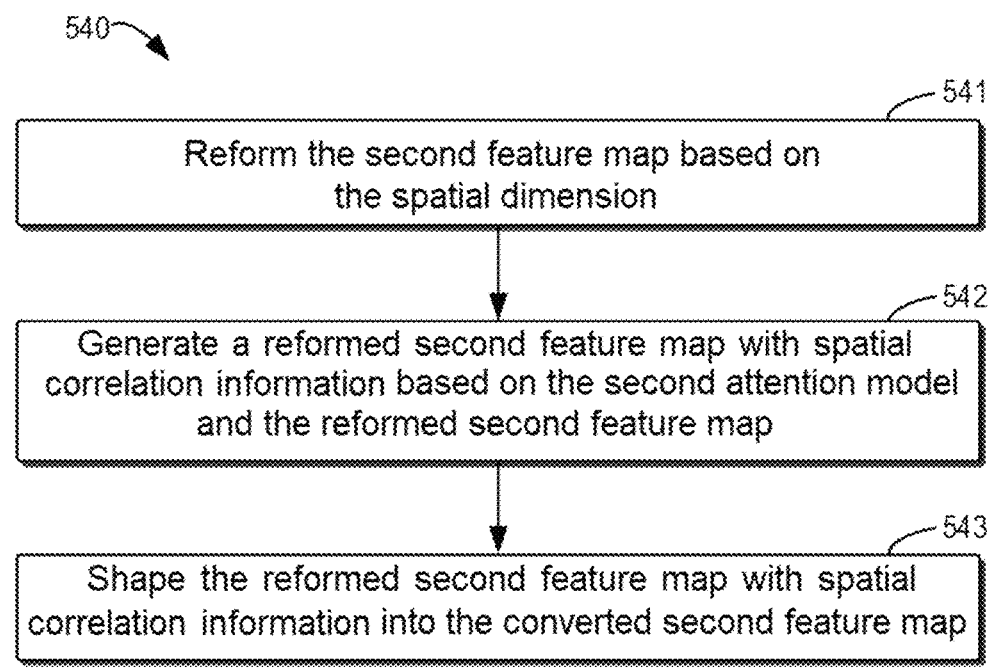
FIG. 5B shows a flow chart of a process for converting a feature map of EEG data according to an embodiment of the present disclosure.

Referring to FIG. 5B, a flow chart of process 540 for converting an EEG feature map according to an embodiment of the present disclosure is shown. Process 540 may be an example implementation of block 340 of FIG. 3.

At block 541, second feature map 203 is reformed based on the spatial dimension. Second feature map 203 may be reformed by using spatial reformation module 241 in second conversion model 240. Spatial reformation module 241 splices and reforms second feature map 203 of C×P×P×T, and reforms second feature map 203 based on the spatial dimension C into multidimensional data in a dimension size of C×P×(T×P).

At block 542, based on second attention model 242 and the reformed second feature map, a reformed second feature map with spatial correlation information is generated. Correlation information along the spatial dimension of the EEG data may be calculated by using second attention model 242. For the EEG data, the temporal dimension is non-local, and therefore, spatial correlation information for EEG data 106 can be extracted.

At block 543, the reformed second feature map with spatial correlation information is shaped into converted second feature map 204. Converted second feature map 204 and second feature map 203 have the same size, both of which are C×P×P×T.

It should be noted that the steps in blocks 310 and 320 and the steps in blocks 330 and 340 may be performed in a different order from that shown in FIG. 3. For example, blocks 310 and 320 and blocks 330 and 340 may be performed in parallel, or performed in any other order.

Still referring to FIG. 3, at block 350, predicted image 102 is generated based on converted first feature map 202 and converted second feature map 204. In some embodiments, generated image 102 may be extracted using generation model 250 in FIG. 2.

Figure 6:
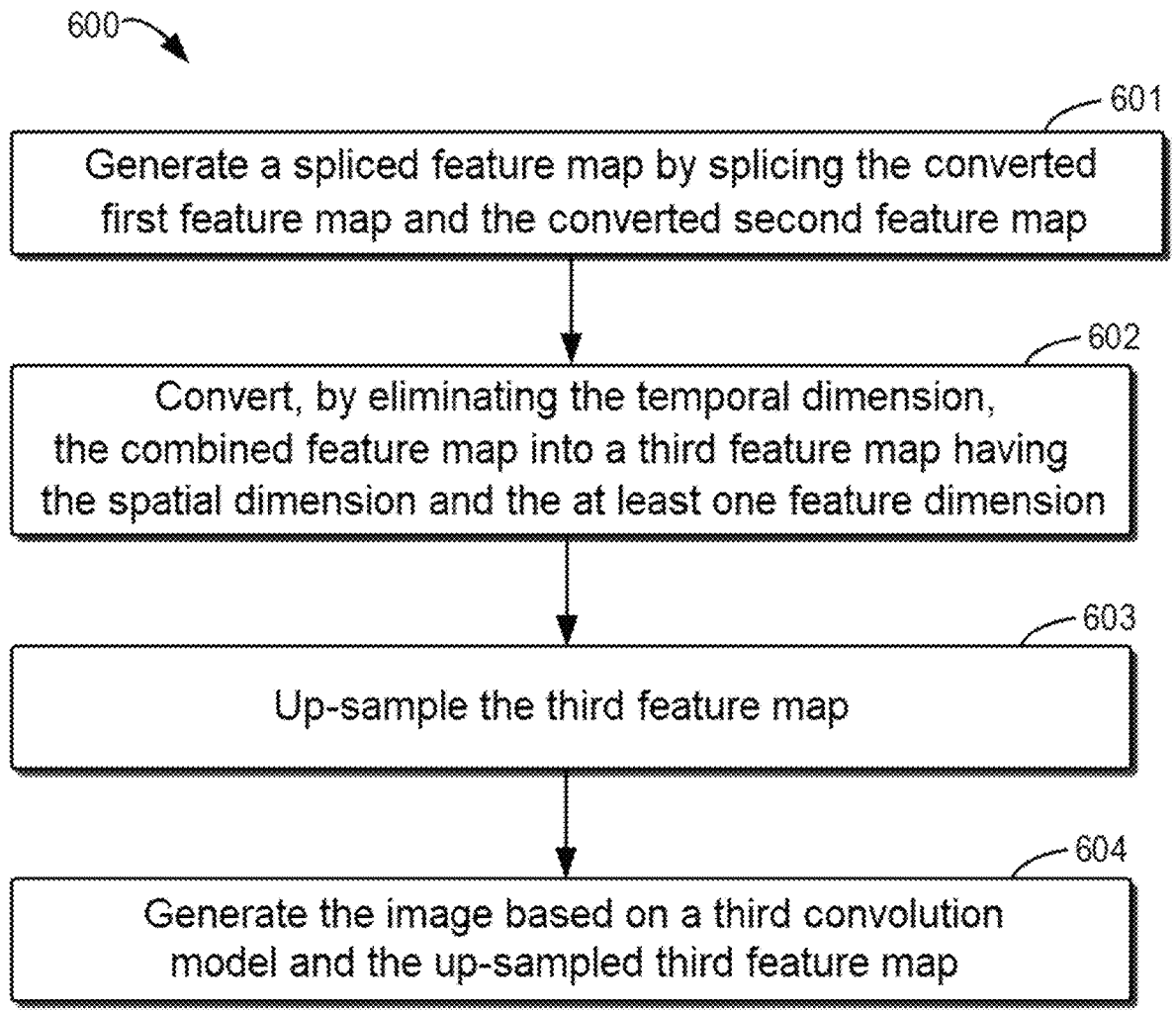
FIG. 6 shows a flow chart of a process of generating an image based on converted fMRI and EEG feature maps according to an embodiment of the present disclosure.

FIG. 6 shows a flow chart of process 600 for generating an image based on converted fMRI and EEG feature maps according to an embodiment of the present disclosure. Process 600 may be an example implementation of block 350 of FIG. 3. Here, the converted fMRI feature map is converted first feature map 202, and the converted EEG feature map is converted second feature map 204.

At block 601, a spliced feature map is generated by splicing converted first feature map 202 and converted second feature map 204, the spliced feature map providing a combined feature map. At block 602, the combined feature map is converted, by eliminating the temporal dimension, into a third feature map having a spatial dimension and at least one feature dimension. In some embodiments, the actions in blocks 601 and 602 may be implemented by using splicing and projection module 251 in FIG. 2. As described above, after splicing and projection, three-dimensional data in a dimension size of 2C×P×P is obtained.

At block 603, the third feature map is up-sampled. In some embodiments, up-sampling module 252 may be used to up-sample the three-dimensional data in a size of 2C×P×P obtained after splicing and projection to generate three-dimensional data of 2C×H×W.

At block 604, predicted image 102 is generated based on third convolution model 253 and the up-sampled third feature map. In some embodiments, third convolution model 253 is used for converting three-dimensional data in a size of 2C×H×W to three-dimensional data of 3×H×W. Predicted image 102 may be generated by taking color channel as the first dimension, and the height and width of the image as the second dimension H and the third dimension W.

The process of generating an image from fMRI data and EEG data using a neural network model according to embodiments of the present disclosure is described above with reference to FIG. 1 to FIG. 6. In this process, combined with the characteristics of the fMRI data and the EEG data, the neural network model is used for respectively extracting the correlation information across time and space, and therefore, the content viewed by a user can be effectively inferred from physiological data of the user. A training process of the neural network model will be described below with reference to FIG. 7.

Figure 7:
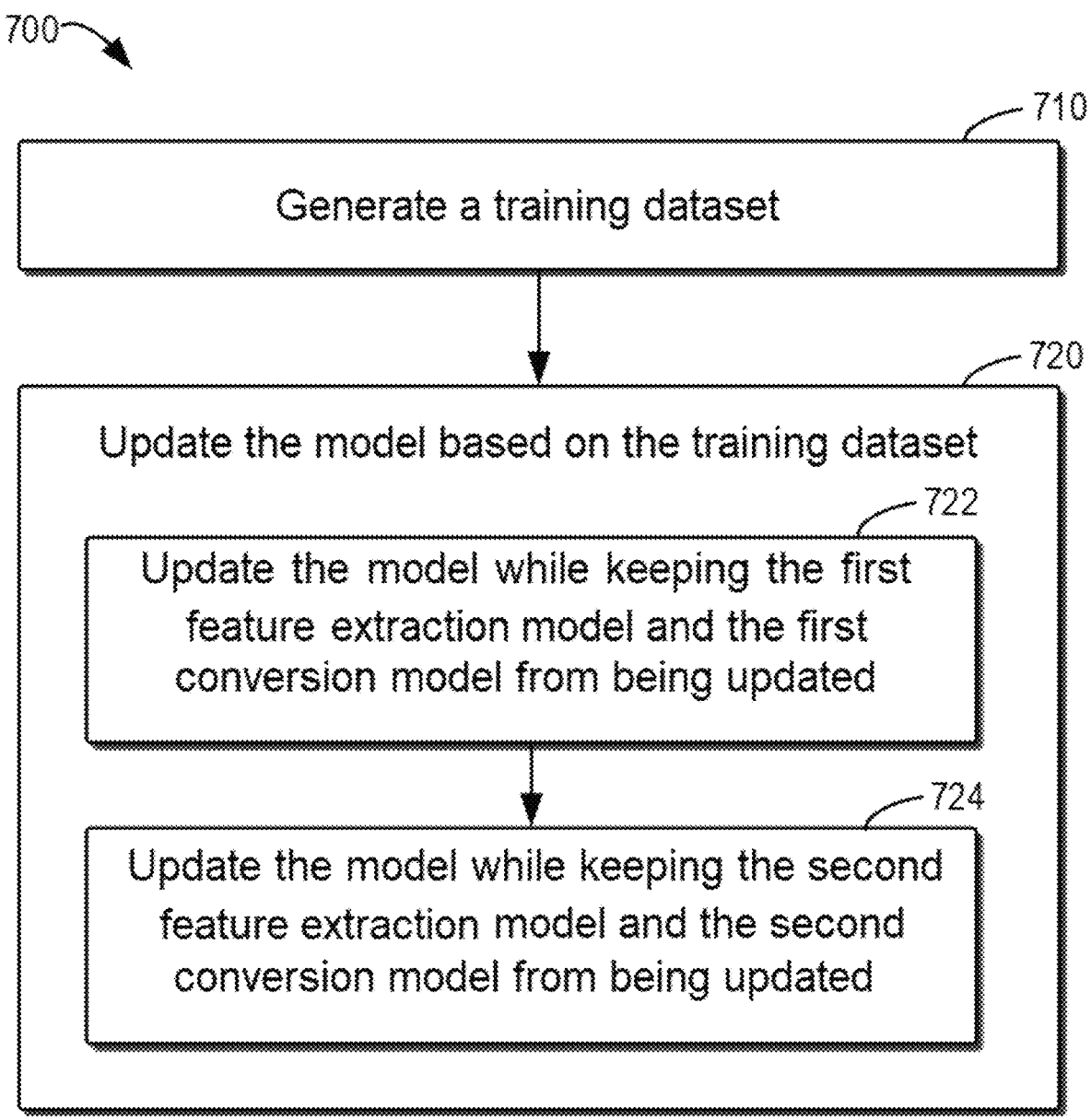
FIG. 7 shows a flow chart of a process of training a neural network model according to an embodiment of the present disclosure.

FIG. 7 shows a flow chart of process 700 of training a neural network model according to an embodiment of the present disclosure. The trained neural network model may be part or all of neural network model 200 described with reference to FIG. 2. In some embodiments, the trained model may include: a first feature extraction model configured to extract from fMRI data a first feature map of the fMRI data. The first feature map is multidimensional data having a temporal dimension related to a sample collection time of the fMRI data. The trained model further includes a first conversion model configured to convert the first feature map based on the temporal dimension. The first conversion model includes a first attention model. The trained model further includes a second feature extraction model configured to extract from EEG data a second feature map of the EEG data. The second feature map is multidimensional data having a spatial dimension related to an electrode for collecting the EEG data. The trained model further includes a second conversion model configured to convert the second feature map based on the spatial dimension. The second conversion model includes a second attention model. The trained model further includes a generation model configured to generate an image based on the converted first feature map and the converted second feature map. Process 700 may be performed by any suitable computing device, such as a personal computer, a notebook computer, a server or cluster, a cloud-deployed device, and other devices.

At block 710, a training dataset is generated. The training dataset includes a group of target images and fMRI data and EEG data collected when a person is viewing the group of target images. To expand the training dataset, two or more target images may be spatially combined, and fMRI data and EEG data when the person is viewing the combined images may be collected and generated. In some embodiments, the training dataset includes a first target image and first fMRI data and first EEG data corresponding to the first target image, a second target image and second fMRI data and second EEG data corresponding to the second target image, and a third target image and third fMRI data and third EEG data corresponding to the third target image. The third target image is a spatial combination of the first target image and the second target image.

Since a human brain is sensitive to the spatial distribution of images, more differentiated EEG data and fMRI data can be obtained by spatially combining a plurality of images in different manners (for example, left and right, up and down, and the like). Using such training data, the neural network model can be trained more effectively.

At block 720, the model is updated based on the training dataset. In some embodiments, updating the neural network model based on the training dataset includes updating the model by using a loss function, and the loss function may be constructed as follows:

$$L = \sum_{i=0}^{N}\|Y_i - Y'_i\|^2 + \sum_{i=0}^{N}\|VGG(Y_i) - VGG(Y'_i)\|^2 + \|POG(Y_i) - POG(Y'_i)\|^2$$

Here, L represents the loss function, $Y_i$ represents a target image, that is, a training target, $Y'_i$ represents a prediction result of the model, i represents a training data label, and N is the size of a training data batch. In the above loss function, $$\sum_{i=0}^{N}\|Y_i - Y'_i\|^2$$

represents a pixel comparison result between a predicted image generated by the model from the fMRI data and the EEG data and a corresponding target image, and $$\sum_{i=0}^{N}\|VGG(Y_i) - VGG(Y'_i)\|^2$$

represents a semantic comparison result between the predicted image and the target image, $$\|POG(Y_i) - POG(Y'_i)\|^2$$

represents a structural comparison result between the predicted image and the target image. The notation VGG denotes a Visual Geometry Group network may be an image semantic extraction network. The notation POG denotes Pyramid of Gaussian, also known as Gaussian Pyramid, which is used for extracting structural features of images. It should be understood that other semantic extraction networks may also be used, and other structural features may be used.

In some embodiments, updating the model based on the training dataset may include: at block 722, updating neural network model 200 while keeping first feature extraction model 210 and first conversion model 220 from being updated, and at block 724, updating the neural network model 200 while keeping second feature extraction model 230 and second conversion model 240 from being updated. The actions of block 722 and block 724 may be performed alternately. Based on this method, the model on the fMRI side and the model on the EEG side may be adjusted at the same time, so that the quality of an image reconstructed by neural network model 200 can be improved.

Figure 8:
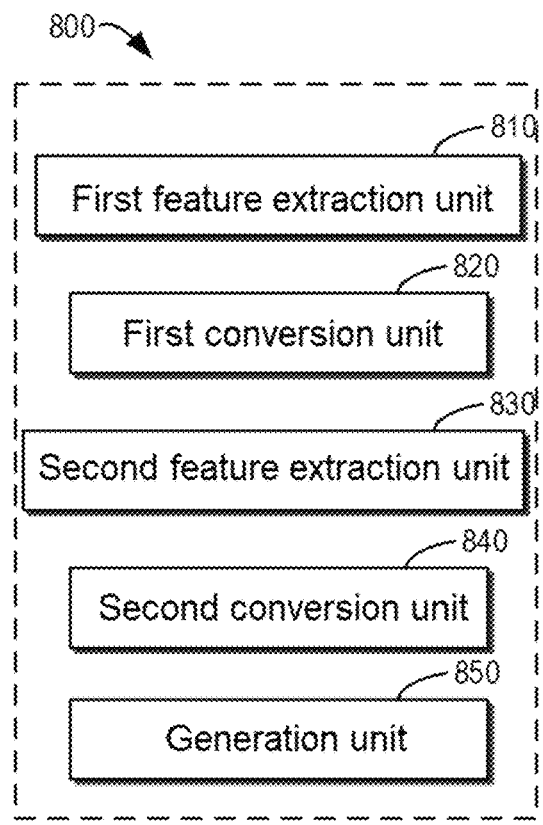
FIG. 8 shows a block diagram of an apparatus for generating an image from fMRI data and EEG data according to an embodiment of the present disclosure.

FIG. 8 shows a block diagram of apparatus 800 for generating an image from fMRI data and EEG data according to an embodiment of the present disclosure.

Apparatus 800 includes first feature extraction unit 810, first conversion unit 820, second feature extraction unit 830, second conversion unit 840, and generation unit 850.

First feature extraction unit 810 is configured to extract a first feature map of the fMRI data, the first feature map being multidimensional data having a temporal dimension related to a sample collection time of the fMRI data. First conversion unit 820 is configured to convert the first feature map based on the temporal dimension of the first feature map and a first attention model. Second feature extraction unit 830 is configured to extract a second feature map of the EEG data, the second feature map being multidimensional data having a spatial dimension related to an electrode for collecting the EEG data. Second conversion unit 840 is configured to convert the second feature map based on the spatial dimension of the second feature map and a second attention model. Generation unit 850 is configured to generate an image based on the converted first feature map and the converted second feature map.

In some embodiments, the fMRI data and the EEG data are collected in the same time period. First feature extraction unit 810 may further be configured to perform temporal position encoding on the fMRI data, and generate the first feature map based on a first convolution model and the position-encoded fMRI data. Second feature extraction unit 830 may be configured to perform temporal position encoding on the EEG data, shape the position-encoded EEG data, and generate the second feature map based on a second convolution model and the shaped position-encoded EEG data.

In some embodiments, first conversion unit 820 may further be configured to: reform the first feature map based on the temporal dimension; generate a reformed first feature map with temporal correlation information based on the first attention model and the reformed first feature map; and shape the reformed first feature map with temporal correlation information into the converted first feature map, the converted first feature map and the first feature map having the same size.

In some embodiments, second conversion unit 840 may further be configured to: reform the second feature map based on the spatial dimension; generate a reformed second feature map with spatial correlation information based on the second attention model and the reformed second feature map; and shape the reformed second feature map with spatial correlation information into the converted second feature map, the converted second feature map and the second feature map having the same size.

In some embodiments, the first feature map and the second feature map have the same size in the spatial dimension, at least one feature dimension, and the temporal dimension.

In some embodiments, generation unit 850 may further be configured to: generate a spliced feature map by splicing the converted first feature map and the converted second feature map, the spliced feature map providing a combined feature map; convert, by eliminating the temporal dimension, the combined feature map into a third feature map having a spatial dimension and at least one feature dimension; up-sample the third feature map; and generate an image based on a third convolution model and the up-sampled third feature map.

In some embodiments, the fMRI data may include multidimensional data with a width of an fMRI image, a height of the fMRI image, a color channel, and a sampling time as dimensions, and the EEG data may include multidimensional data with a signal intensity of an EEG signal, an electrode for collecting the EEG signal, and a sampling time as dimensions.

Figure 9:
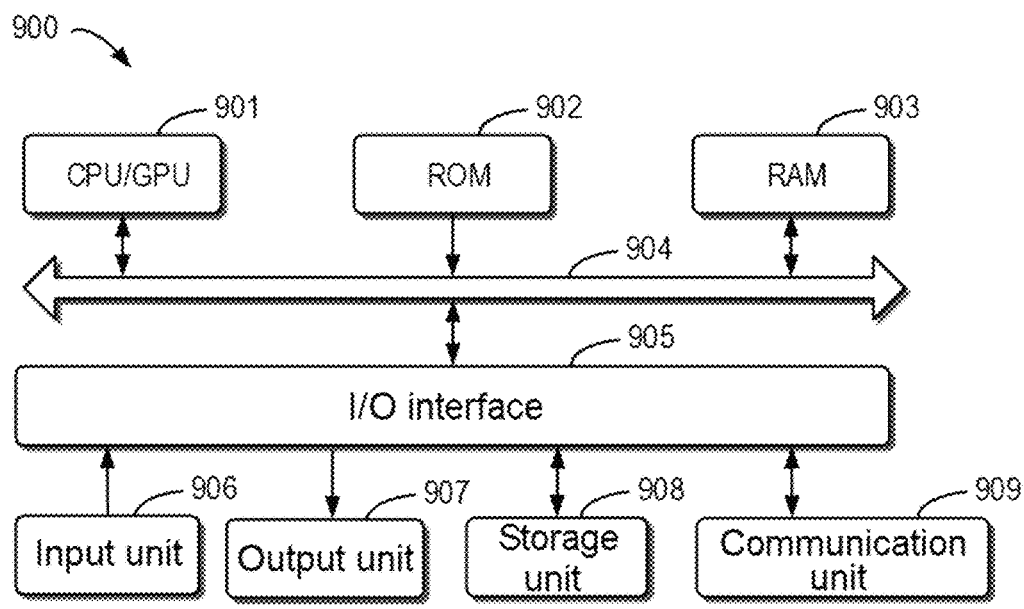
FIG. 9 shows a block diagram of an example device that may be configured to implement embodiments of the present disclosure.

FIG. 9 shows a block diagram of example device 900 that may be configured to implement embodiments of the present disclosure. For example, the method for generating an image and the method for training a model according to embodiments of the present disclosure may both be implemented by device 900. As shown in the figure, device 900 includes central processing unit (CPU) and/or graphic processing unit (GPU) 901 that may perform various appropriate actions and processing according to computer program instructions stored in read-only memory (ROM) 902 or computer program instructions loaded from storage unit 908 to random access memory (RAM) 903. Various programs and data required for the operation of device 900 may also be stored in RAM 903. CPU/GPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, such as the methods described with reference to FIG. 3 to FIG. 7, may be performed by CPU/GPU 901. For example, in some embodiments, one or more of the methods described with reference to FIG. 3 to FIG. 7 may be embodied as a computer software program that is tangibly included in a machine-readable medium, such as storage unit 908. In some embodiments, part or all of the computer program may be loaded and/or installed onto device 900 via ROM 902 and/or communication unit 909. When the computer program is loaded into RAM 903 and executed by CPU/GPU 901, one or more actions of the methods described above may be executed.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various implementations of the present disclosure have been described above. The foregoing description is illustrative rather than exhaustive, and is not limited to the disclosed implementations. Numerous modifications and alterations will be apparent to persons of ordinary skill in the art without departing from the scope and spirit of the illustrated implementations. The selection of terms used herein is intended to best explain the principles and practical applications of the implementations and their associated technical improvements, so as to enable persons of ordinary skill in the art to understand the implementations disclosed herein.

What is claimed is:

1. A method for generating an image from functional magnetic resonance imaging (fMRI) data and electroencephalogram (EEG) data, comprising:
   extracting a first feature map of the fMRI data, the first feature map being multidimensional data having a temporal dimension related to a sample collection time of the fMRI data;
   converting the first feature map based on the temporal dimension of the first feature map and a first attention model;
   extracting a second feature map of the EEG data, the second feature map being multidimensional data having a spatial dimension related to an electrode for collecting the EEG data;
   converting the second feature map based on the spatial dimension of the second feature map and a second attention model; and
   generating an image based on the converted first feature map and the converted second feature map.

2. The method according to claim 1, wherein the fMRI data and the EEG data are collected in the same time period,
   extracting the first feature map of the fMRI data comprises:
   performing temporal position encoding on the fMRI data; and
   generating the first feature map based on a first convolution model and the position-encoded fMRI data; and
   extracting the second feature map of the EEG data comprises:
   performing temporal position encoding on the EEG data;
   shaping the position-encoded EEG data; and
   generating the second feature map based on a second convolution model and the shaped position-encoded EEG data.

3. The method according to claim 1, wherein converting the first feature map based on the temporal dimension and the first attention model comprises:
   reforming the first feature map based on the temporal dimension;
   generating a reformed first feature map with temporal correlation information based on the first attention model and the reformed first feature map; and
   shaping the reformed first feature map with temporal correlation information into the converted first feature map, the converted first feature map and the first feature map having the same size.

4. The method according to claim 1, wherein converting the second feature map based on the spatial dimension and the second attention model comprises:
   reforming the second feature map based on the spatial dimension;

generating a reformed second feature map with spatial correlation information based on the second attention model and the reformed second feature map; and shaping the reformed second feature map with spatial correlation information into the converted second feature map, the converted second feature map and the second feature map having the same size.

5. The method according to claim 1, wherein the first feature map and the second feature map have the same size in spatial dimension, at least one feature dimension, and temporal dimension.

6. The method according to claim 5, wherein generating the image based on the converted first feature map and the converted second feature map comprises:

generating a spliced feature map by splicing the converted first feature map and the converted second feature map, the spliced feature map providing a combined feature map;

converting, by eliminating the temporal dimension, the combined feature map into a third feature map having the spatial dimension and the at least one feature dimension;

up-sampling the third feature map; and generating the image based on a third convolution model and the up-sampled third feature map.

7. The method according to claim 1, wherein the fMRI data comprises multidimensional data with a width of an fMRI image, a height of the fMRI image, a color channel, and a sampling time as dimensions, and the EEG data comprises multidimensional data with a signal intensity of an EEG signal, an electrode for collecting the EEG signal, and a sampling time as dimensions.

8. An electronic device comprising:

at least one processing unit; and at least one memory that is coupled to the at least one processing unit and stores instructions for execution by the at least one processing unit, wherein the instructions, when executed by the at least one processing unit, cause the electronic device to perform the method according to claim 1.

9. A non-transitory computer-readable storage medium, comprising machine-executable instructions that, when executed by a device, cause the device to perform the method according to claim 1.

10. A method for training a model, wherein the model comprises: a first feature extraction model configured to extract, from functional magnetic resonance imaging (fMRI) data, a first feature map of the fMRI data, the first feature map being multidimensional data having a temporal dimension related to a sample collection time of the fMRI data; a first conversion model configured to convert the first feature map based on the temporal dimension, the first conversion model comprising a first attention model; a second feature extraction model configured to extract, from electroencephalogram (EEG) data, a second feature map of the EEG data, the second feature map being multidimensional data having a spatial dimension related to an electrode for collecting the EEG data; a second conversion model configured to convert the second feature map based on the spatial dimension, the second conversion model comprising a second attention model; and a generation model configured to generate an image based on the converted first feature map and the converted second feature map, and the method comprises:

generating a training dataset; and updating the model based on the training dataset, wherein the training dataset comprises:

a first target image and first fMRI data and first EEG data corresponding to the first target image;

a second target image and second fMRI data and second EEG data corresponding to the second target image; and a third target image and third fMRI data and third EEG data corresponding to the third target image, wherein the third target image is a spatial combination of the first target image and the second target image.

11. The method according to claim 10, wherein updating the model based on the training dataset comprises updating the model using a loss function, the loss function comprises a pixel comparison result between a predicted image generated by the model from fMRI data and EEG data and a corresponding target image, a semantic comparison result between the predicted image and the target image, and a structure comparison result between the predicted image and the target image.

12. The method according to claim 10, wherein updating the model comprises:

updating the model while keeping the first feature extraction model and the first conversion model from being updated; and updating the model while keeping the second feature extraction model and the second conversion model from being updated.

13. A non-transitory computer-readable storage medium, comprising machine-executable instructions that, when executed by a device, cause the device to perform the method according to claim 10.

14. An apparatus for generating an image from functional magnetic resonance imaging (fMRI) data and electroencephalogram (EEG) data, comprising:

a first feature extraction unit configured to extract a first feature map of the fMRI data, the first feature map being multidimensional data having a temporal dimension related to a sample collection time of the fMRI data;

a first conversion unit configured to convert the first feature map based on the temporal dimension of the first feature map and a first attention model;

a second feature extraction unit configured to extract a second feature map of the EEG data, the second feature map being multidimensional data having a spatial dimension related to an electrode for collecting the EEG data;

a second conversion unit configured to convert the second feature map based on the spatial dimension of the second feature map and a second attention model; and a generation unit configured to generate an image based on the converted first feature map and the converted second feature map.

15. The apparatus according to claim 14, wherein the fMRI data and the EEG data are collected in the same time period, the first feature extraction unit is further configured to: perform temporal position encoding on the fMRI data; and generate the first feature map based on a first convolution model and the position-encoded fMRI data; and the second feature extraction unit is further configured to: perform temporal position encoding on the EEG data; shape the position-encoded EEG data; and generate the second feature map based on a second convolution model and the shaped position-encoded EEG data.

16. The apparatus according to claim 14, wherein the first conversion unit is further configured to:
- reform the first feature map based on the temporal dimension;
- generate a reformed first feature map with temporal correlation information based on the first attention model and the reformed first feature map; and
- shape the reformed first feature map with temporal correlation information into the converted first feature map, the converted first feature map and the first feature map having the same size.

17. The apparatus according to claim 14, wherein the second conversion unit is further configured to:
- reform the second feature map based on the spatial dimension;
- generate a reformed second feature map with spatial correlation information based on the second attention model and the reformed second feature map; and
- shape the reformed second feature map with spatial correlation information into the converted second feature map, the converted second feature map and the second feature map having the same size.

18. The apparatus according to claim 14, wherein the first feature map and the second feature map have the same size in spatial dimension, at least one feature dimension, and temporal dimension.

19. The apparatus according to claim 18, wherein the generation unit is further configured to:
- generate a spliced feature map by splicing the converted first feature map and the converted second feature map, the spliced feature map providing a combined feature map;
- convert, by eliminating the temporal dimension, the combined feature map into a third feature map having the spatial dimension and the at least one feature dimension; and
- up-sample the third feature map; and
- generate the image based on a third convolution model and the up-sampled third feature map.

20. The apparatus according to claim 14, wherein the fMRI data comprises multidimensional data with a width of an fMRI image, a height of the fMRI image, a color channel, and a sampling time as dimensions, and the EEG data comprises multidimensional data with a signal intensity of an EEG signal, an electrode for collecting the EEG signal, and a sampling time as dimensions.

\* \* \* \* \*